(12) United States Patent
Howell

(10) Patent No.: US 9,081,112 B1
(45) Date of Patent: Jul. 14, 2015

(54) BOREHOLE SEISMIC SYSTEM

(71) Applicant: William R. Howell, Fort Worth, TX (US)

(72) Inventor: William R. Howell, Fort Worth, TX (US)

(73) Assignee: WRHowell, LLC, Fort Worth, TX (US)

( * ) Notice: Subject to any disclaimer, the term of this patent is extended or adjusted under 35 U.S.C. 154(b) by 0 days.

(21) Appl. No.: 14/158,436

(22) Filed: Jan. 17, 2014

(51) Int. Cl.
*G01V 1/52* (2006.01)
*G01V 1/18* (2006.01)
*G01V 1/40* (2006.01)

(52) U.S. Cl.
CPC *G01V 1/18* (2013.01); *G01V 1/181* (2013.01); *G01V 1/40* (2013.01)

(58) Field of Classification Search
CPC ......................................................... G01V 1/52
USPC .......................................................... 181/104
See application file for complete search history.

(56) References Cited

U.S. PATENT DOCUMENTS

| | | | |
|---|---|---|---|
| 4,751,688 A | | 6/1988 | Paulsson |
| 4,789,968 A | * | 12/1988 | Rice ................................ 367/20 |
| 4,932,003 A | * | 6/1990 | Winbow et al. ................. 367/75 |
| 5,027,331 A | * | 6/1991 | Winbow et al. ................. 367/75 |
| 5,060,751 A | * | 10/1991 | Kuhlman et al. ............. 181/102 |
| 5,092,423 A | | 3/1992 | Petermann |
| 5,189,262 A | | 2/1993 | Engler et al. |
| 5,357,486 A | | 10/1994 | Pearce |
| 5,712,829 A | * | 1/1998 | Tang et al. ........................ 367/75 |
| 5,731,550 A | * | 3/1998 | Lester et al. ................... 181/102 |
| 5,877,996 A | * | 3/1999 | Krokstad et al. ................. 367/31 |
| 6,026,913 A | | 2/2000 | Mandal et al. |
| 6,749,030 B2 | * | 6/2004 | Blair et al. ....................... 175/45 |
| 7,263,029 B2 | | 8/2007 | Jackson et al. |
| 7,414,918 B2 | * | 8/2008 | Hurst et al. ...................... 367/35 |
| 8,255,164 B2 | | 8/2012 | Horne |
| 2003/0218939 A1 | | 11/2003 | Casarsa et al. |
| 2004/0216872 A1 | * | 11/2004 | Foster et al. ............. 166/250.01 |
| 2008/0316860 A1 | | 12/2008 | Muyzert et al. |
| 2012/0103688 A1 | | 5/2012 | Coman et al. |
| 2012/0236687 A1 | | 9/2012 | Owen |
| 2012/0274477 A1 | | 11/2012 | Prammer |

FOREIGN PATENT DOCUMENTS

WO    WO 2012/168679    12/2012

* cited by examiner

*Primary Examiner* — Forrest M Phillips
(74) *Attorney, Agent, or Firm* — Sterne, Kessler, Goldstein & Fox P.L.L.C.

(57) ABSTRACT

A well borehole seismic sensing system having one or more rotatable sensor arrays. The sensor arrays can have one or more groups of sensors disposed on a cam shaft located along a portion of a well pipe. The sensors can be located within a housing contacting the cam shaft. A motor can rotate the sensors around a longitudinal axis of the pipe.

23 Claims, 15 Drawing Sheets

BOREHOLE SEISMIC SYSTEM

BACKGROUND

1. Field

The present disclosure relates to a well borehole seismic sensing system. More specifically, the present disclosure relates to a well borehole seismic sensing system having a plurality of rotatable sensor arrays.

2. Background

Seismic sources and sensors can be deployed in well boreholes for a variety of oilfield operations, including monitoring well operations, fracturing operations, performing "seismic-profiling" surveys to obtain enhanced subsurface seismic maps and monitoring downhole vibrations.

Seismic sensors deployed in well boreholes can be useful in monitoring fracturing and injection well operations, obtaining seismic measurements over time, and creating enhanced subsurface maps and to improve reservoir modeling. Seismic data can include natural seismic data (e.g., from earthquakes), seismic signals generated by conventional surface or subsurface seismic sources, and seismic signals generated by formation fracturing. Presently, the majority of seismic data is gathered by wireline methods or by deploying seismic sensors such as geophones on coiled tubing or production pipe. By way of example, a conventional three-axis geophone can detect particle motion in three mutually orthogonal directions (x, y, and z directions).

Modern petroleum drilling and production operations demand a great quantity of information relating to parameters and conditions downhole. Using this information, the driller can more precisely determine the orientation of the bottomhole assembly and the type of formation through which the bottomhole assembly formation is drilling. The collection of information relating to conditions downhole is commonly referred to as "logging". In conventional oil well wireline logging, a probe is lowered into the borehole after some or all of the well has been drilled. The probe is used to determine certain characteristics of the formations traversed by the borehole. The probe can include one or more sensors to measure parameters downhole and typically is constructed as a small hermetically sealed steel cylinder for housing the sensors, which hangs at the end of a long cable or "wireline." The cable or wireline provides mechanical support to the probe and also provides an electrical connection between the sensors and associated instrumentation within the probe and electrical equipment located at the surface of the well. Normally, the cable supplies operating power to the probe and is used as an electrical conductor to transmit information signals from the probe to the surface. In accordance with conventional techniques, various parameters of the earth's formations are measured and correlated with the position of the probe in the borehole as the probe is pulled uphole.

While wireline logging can be useful in gathering information, it has certain disadvantages. For example, before the wireline logging tool can be run in the wellbore, the drill string must first be removed from the borehole, resulting in considerable cost and loss of drilling time. In addition, because wireline tools are unable to collect data during the actual drilling operation, drillers must make some decisions (such as the direction to drill, etc.) without sufficient information. And because wireline logging occurs after the wellbore is drilled, the accuracy of the wireline measurement is questionable as drilling mud begins to invade the formation surrounding the borehole.

These limitations associated with wireline logging have resulted in increased emphasis on the collection of data during the drilling process. By collecting and processing data during the drilling process, without having to remove the drilling assembly to insert a wireline logging tool, the driller can make accurate modifications or corrections in "real-time" to optimize performance, and the measurements during drilling increase the integrity of the measured data.

Other present technology for seismic and micro-seismic data collection within the oil and gas industry relies on an array of geophones, positioned some distance away, inside the wellbore casing of monitoring wells. The location of a monitoring well, or wells, from the target well being drilled, is positioned in a known location suitable for data gathering. But it is difficult to determine the actual position of the geophone array placed in the monitoring well. The positioning of an instrumented array, sometimes totaling fifteen in one string, is unknown inside the borehole. To correct for this unknown position requires a calibrated seismic source(s) to generate a known position. Then, sophisticated algorithms must be used to determine the rotation of each geophone array from the source. Using this method, the data collected during the fracturing process has been shown to have errors.

The borehole sensing systems (BSS) and methods described herein can reduce error and provide improved data collection, resulting in more accurate analysis of a reservoir being fractured. This can be accomplished by locating sensors in the vertical shaft wellbore casing. In conjunction with the monitoring well data, a more precise presentation of azimuthal orientation of a hydraulically propagated fracture can be achieved in the post analysis process.

The BSS is also designed to improve the analysis of the horizontal borehole and provide improved data analysis through software models by providing a quicker "snapshot" of the data collected, through preprocessing, as the sensor data streams through to a memory storage array. By reducing error in the data collection process, analytical results can be improved. The BSS can also provide flexibility in altering data sets in real-time, without altering the stream of data collected. Additional sensors can be installed, providing a triangulation of arrays, which can improve the overall accuracy of modeling the formation over time.

BRIEF SUMMARY

The BSS and methods described herein can operate by permanently installing one or more geophone arrays into the primary borehole easing. The arrays can be strategically located above the kick-off point and at depths where hard rock formations are identified. As discussed herein, the "kick-off" point is the depth where the vertical borehole begins to deviate in the horizontal direction. Each geophone array can be electro-mechanically positioned to record targeted areas of potential seismic events surrounding the borehole. Additionally, the BSS can provide a separate design for a downhole tool that simulates coded seismic events (using a programmable acoustic source) through the length of the horizontal borehole to provide a topographic signature of the rock formation surrounding the borehole before the fracturing process is implemented. This can allow high value seismic data to be collected at each stage of the drilling process. Data can be converted from analog signal to digital in each array and transmitted uphole through a cable delivery system to a data support kit located near the borehole.

With geophones permanently installed in the casing, and having rotationally and directionally controllable arrays, the BSS can provide flexibility for choosing how and where to target data collection. Data collected from additional borehole installations and strategically located monitoring wells can provide an accurate assessment of the strata formation, previously not attainable, throughout the life of the drill site.

Further, the BSS can provide accurate seismic/micro-seismic data targeted with the direction of drilling surrounding the borehole. The BSS can provide a tool for precise, direct alignment of an acoustical geophone bank, in a phased pattern, for concentrating collection of data. This can also improve the filtering of extraneous noise, thereby increasing the accuracy of the measured data. This new capability of alignment in the borehole can eliminate the need to perform complicated mathematical corrections currently employed with geophone alignment in surrounding monitoring wells, leading to improved analysis of the formation that is being drilled and/or fractured.

In general a "top drive" system is the most suitable drive system for the BSS embodiments described herein. A top drive can avoid twisting the casing as it is installed and placed into the borehole. A top drive is preferred to a "kelly drive" system because a kelly drive twists the casing string when threading on a new section of pipe. This can damage the signal cable by wrapping the cable around the pipe, possibly destroying the cable as the casing is twisted and inserted into the borehole, which risks making the sensor array useless.

Therefore, the BSS is preferably a one-time permanent installation of one or more sensor arrays into the borehole. Constraints exist because of the unique environmental and structural conditions. Once the BSS is sent downhole, and the casing is cemented, the sensor arrays cannot be removed for repair or replacement. With continuous exposure to a caustic environment of the cement and hydrogen gases, if the sensor arrays fail for any reason, then the value of the BSS is significantly degraded. Therefore, it is preferable that the BSS has a long operating life and low operational failure. In certain embodiments, the sensor arrays can be made of a stainless steel grade material that is evacuated, filled with an inert gas, and then hermetically sealed to provide the electronic and mechanical components protection from exposure to the downhole environment.

Certain embodiments of the sensing systems for a well borehole described herein can have a pipe and a cam shaft disposed along a portion of the pipe. A plurality of sensors can be disposed next to the cam shaft and a control mechanism (e.g., a motor) can rotate the sensors around a longitudinal axis of the pipe. In certain embodiments, the sensors can be rotated 360 degrees around the longitudinal axis of the pipe.

In certain embodiments, the pipe can have an upper portion having an upper housing and a lower portion having a lower housing. A shroud can surround the upper portion and the lower portion of the pipe. In certain embodiments, the lower portion of the pipe rotates around the longitudinal axis of the pipe while the upper portion remains stationary.

In certain embodiments, a control unit can communicate with the sensors. The control unit can have a processor and a power supply. In certain embodiments, the sensors can be geophones. In certain embodiments, the geophones can be arranged in three groups spaced evenly (i.e., 120 degrees apart) around the longitudinal axis of the pipe. In certain embodiments, each group of geophones can have five geophones. In certain embodiments, each group of geophones can be located inside a housing. An electronics module can also be located inside the housing. In certain embodiments, the geophones in each group of geophones can be spaced vertically in relation to each other.

In certain embodiments, the pipe can be connected to second pipe such that a top end of the second pipe is connected to a bottom end of the pipe. In certain embodiments, the second pipe can have a plug. The plug can be tapered such that a first end of the plug located at the bottom end of the second pipe has a diameter that is greater than a second end of the plug located closer to the top end of the second pipe.

Certain embodiments of the sensor systems described herein can have a plurality of sensor arrays located along the well pipe. Each sensor array can have a plurality of sensors groups. Each sensor group can have one or more sensors (e.g., geophones). A motor can rotate the sensor groups around a longitudinal axis of the well pipe. In certain embodiments, each sensor array can have three sensor groups spaced at 120 degree intervals around the longitudinal axis of the well pipe.

Methods of measuring seismic activity within a well borehole are also disclosed herein. In certain embodiments, one or more sensor arrays can be arranged along a well pipe. Sensor groups of the sensor arrays can be rotated around the longitudinal axis of the well pipe (e.g., using a motor). In certain embodiments, the sensors of each sensor group can contact a cam shaft and the cam shafts can be moved radially outward relative to the longitudinal axis of the well pipe such that the sensors contact an outer casing surrounding each sensor array. Seismic data can be measured and recorded via the sensors. In certain embodiments, a programmable acoustical source can be used to produce signals to facilitate calibrating the sensor arrays.

BRIEF DESCRIPTION OF THE DRAWINGS/FIGURES

The accompanying figures, which are incorporated herein, form part of the specification and illustrate embodiments of borehole sensing systems and components thereof. Together with the description, the figures further to serve to explain the principles of and allow for the making and using of the embodiments described herein. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

While the disclosure refers to illustrative embodiments, it should be understood that the disclosure is not limited thereto. Modifications can be made to the embodiments described herein without departing from the spirit and scope of the present disclosure. Those skilled in the art with access to this disclosure will recognize additional modifications, applications, and embodiments within the scope of this disclosure and additional fields in which the disclosed examples could be applied. Therefore, the following detailed description is not meant to be limiting.

Further, it is understood that the devices and methods described herein can be implemented in many different embodiments of hardware. Any actual hardware described is not meant to be limiting. The operation and behavior of the device, systems, and methods presented are described with the understanding that modifications and variations of the embodiments are possible given the level of detail presented.

Figure 1:
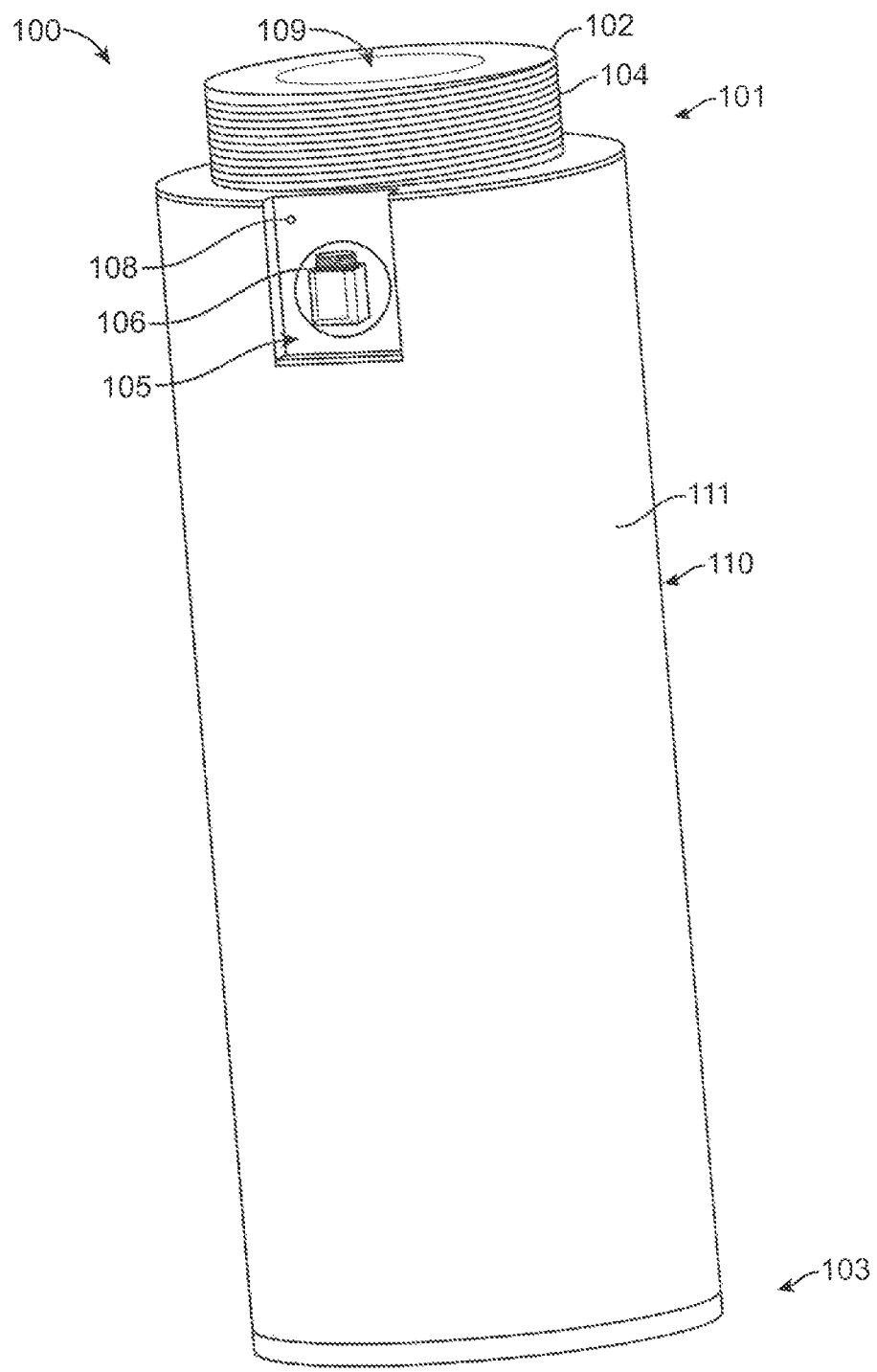
FIG. 1 illustrates an exterior view of a sensor pipe, according to an embodiment.

FIG. 1 illustrates sensor pipe 100, according to an embodiment. Sensor pipe 100 can be placed at a predetermined location along a drill string within a borehole. The depth at which sensor pipe 100 is located within the borehole can therefore be known with a high degree of certainty.

Sensor pipe 100 can include top end 101 and bottom end 103. Top end 101 and bottom end 103 can be connected to other pipes. Sensor pipe 100 can include a shroud 110 having an outer surface 111. Shroud 110 can be made from any suitable material, for example, a thin metal sheet. Shroud 110 can provide a protective outer surface 111 for sensor pipe 100. In certain embodiments, the diameter of shroud 110 can be equal to other pipes in the drill string but the wall thickness of shroud 110 can be less than the wall thickness of the other pipes.

Interior pipe 102 can be located within shroud 110. Interior pipe 102 can include interior passage 109. Interior passage 109 can extend along an entire length of interior pipe 102. A portion of interior pipe 102 can have exterior threading 104. The threaded portion of interior pipe 102 can extend out of shroud 110. Exterior threading 104 can facilitate connection of sensor pipe 100 with another pipe. For example, interior pipe 102 can have exterior threading 104 near top end 101 of sensor pipe 100 so that sensor pipe 100 can be connected to an uphole pipe that has interior threading. It is also contemplated that interior pipe 102 has interior threading to connect with a pipe having exterior threading.

In certain embodiments, shroud 110 can have cutout 105. In certain embodiments, cutout 105 can be located near top end 101 of sensor pipe 100. Cutout 105 can provide an access point to an interior space of sensor pipe 100 (e.g., within shroud 110). In certain embodiments, connection port 106 and/or evacuation port 108 can be located within cutout 105. Locating these components within cutout 105 can protect them from being damaged. Connection port 106 can be used to attach a cable or other device, for example, but not limited to, a power, electrical, or data transmission cable. In certain embodiments, the cable can run along the drill string from above ground to connection port 106. In certain embodiments, the cable can be connected to a computing device above ground. Evacuation port 108 can be used to evacuate gas from inside shroud 110. Evacuation port 108 can also be used to fill an interior space of sensor pipe 100 with an inert gas.

Figure 2:
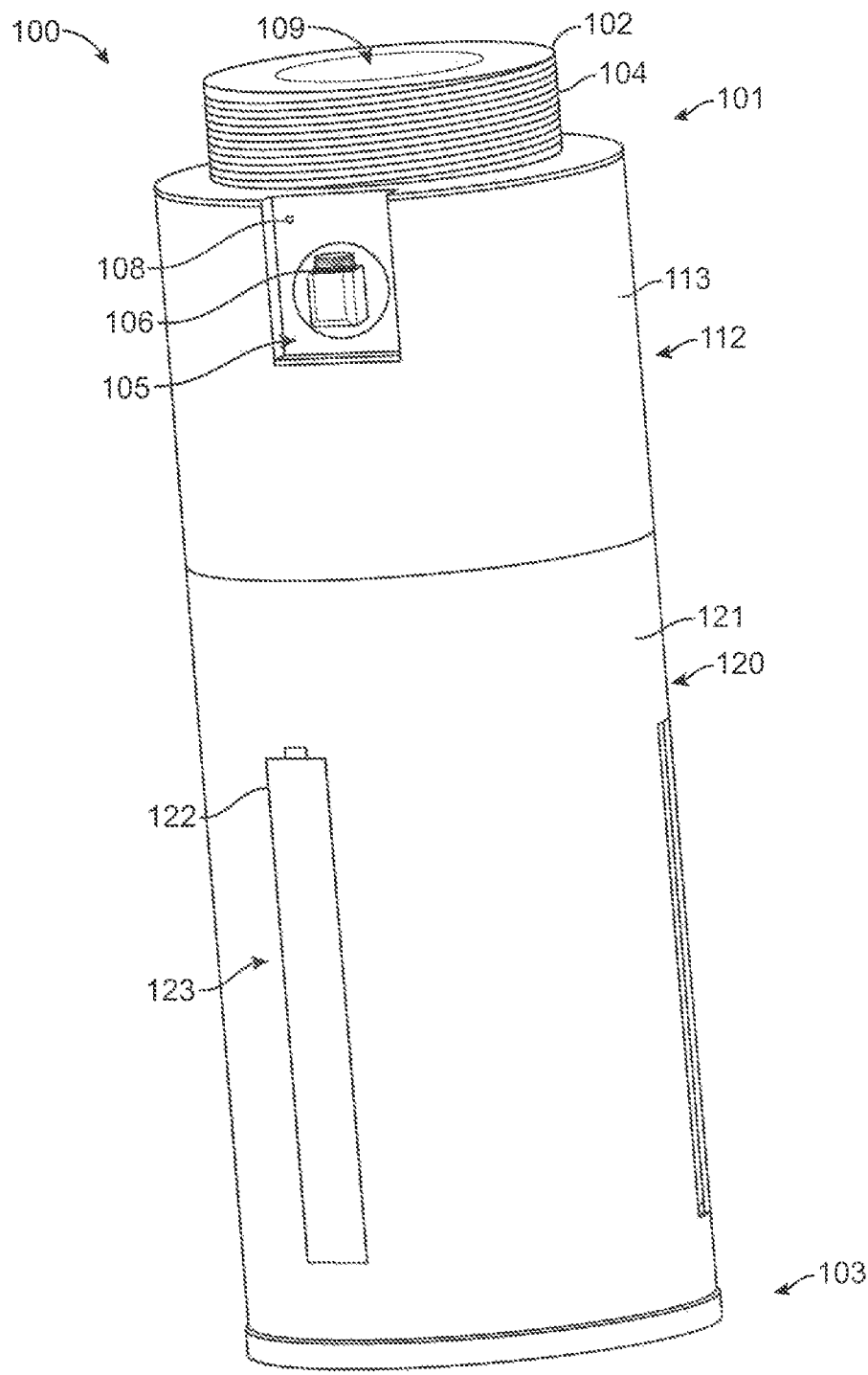
FIG. 2 illustrates an interior view of a sensor pipe, according to an embodiment.

FIG. 2 illustrates sensor pipe 100 with shroud 110 removed, according to an embodiment. As shown in FIG. 2, sensor pipe 100 can have upper portion 112 and lower portion 120. Upper portion 112 and lower portion 120 can have the same or different lengths. As explained in further detail below, in certain embodiments, upper portion 112 can be fixed while lower portion 120 can rotate about the longitudinal axis of sensor pipe 100, or vice versa. It is understood that features described herein with respect to upper portion 112 can be incorporated into lower portion 120, and vice versa.

Upper portion 112 can include upper casing 113 and lower portion 120 can include lower casing 121. Cutout 105 can extend through upper casing 113. In certain embodiments, lower casing 121 can include one or more openings 123. Openings 123 can have any shape, for example, square, rectangular, oval, etc. Sensor housing 122 can be located within opening 123. In certain embodiments, at least a portion of sensor housing 122 can protrude out of opening 123. As explained in greater detail below, sensor housing 122 can be movable such that sensor housing 122 can be extended out of opening 123.

Figure 3:
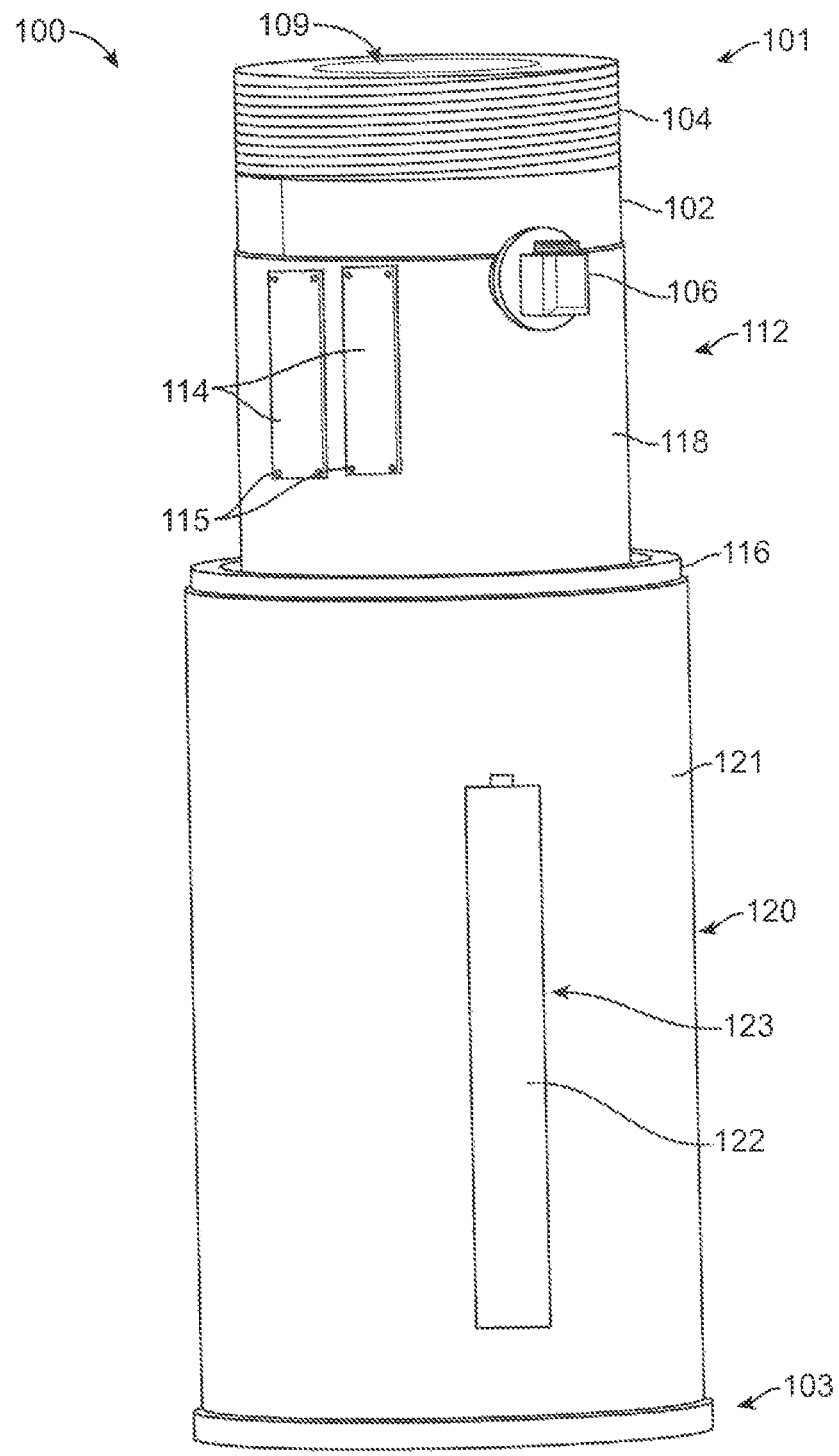
FIG. 3 illustrates an interior view of a sensor pipe according to an embodiment.

FIG. 3 illustrates sensor pipe 100 with upper casing 113 removed, according to an embodiment. A gap can exist between upper casing 113 and interior pipe 102. In certain embodiments, protective layer 118 can surround at least a portion of interior pipe 102. Protective layer 118 can be made from any suitable material, for example, rubber, plastic, or a composite. Protective layer 118 can provide shock absorption and vibration dampening.

In certain embodiments, one or more control unit 114 can be affixed to protective layer 118. Control unit 114 can be affixed to other components, for example, interior pipe 102 or upper casing 113. Control unit 114 can be affixed using one or more fasteners 115, for example, but not limited to, screws. Control unit 114 can include various control components. For example, control unit 114 can include one or more processors, a power supply, a memory, and/or a position sensor. In certain embodiments, control unit 114 can be a computing device. Control unit 114 can communicate with connection port 106 to send and receive signals and/or data, for example, with a computing device located above ground.

In certain embodiments, ring 116 can be located at least partly within upper casing 113. Rings 116 and ring 117 (not shown) can surround protective layer 118 and interior pipe 102. In certain embodiments, ring 117 can be concentric with ring 116. In certain embodiments, there can be a gap between ring 116 and ring 117, and interior pipe 102. Ring 116 can be a thrust bearing assembly that provides for pressure relief and rotational travel of lower portion 120. Ring 117 provide an attachment location for one or more cam shafts 128, which are shown in FIG. 4 and discussed in more detail below.

Figure 4:
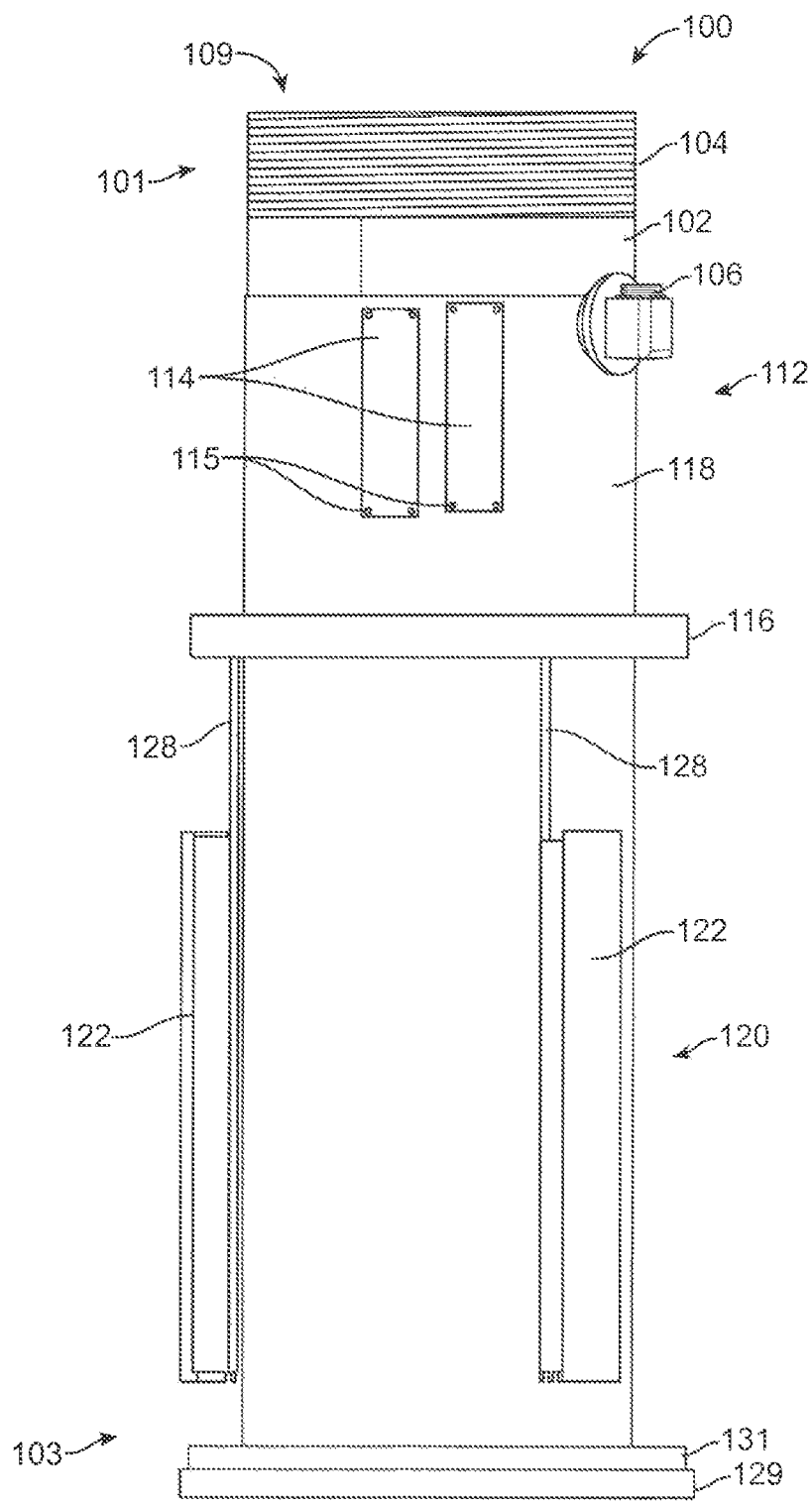
FIG. 4 illustrates an interior view of a sensor pipe, according to an embodiment.

FIG. 4 illustrates sensor pipe 100 with lower casing 121 removed, according to an embodiment. As shown in FIG. 4, protective layer 118 can extend along interior pipe 102 to cover lower portion 120. In certain embodiments, bottom end 103 of sensor pipe 100 can include seal plate 129. As also shown in FIG. 4, one or more cam shaft 128 can extend from ring 117. In certain embodiments, cam shaft 128 can connect to ring 117 via one or more gears. Sensor housing 122 can contact cam shaft 128. In certain embodiments, three cam shafts 128, each contacting a sensor housing 122, can be located around interior pipe 102. In certain embodiments, sensor housings 122 can be evenly spaced 120 degrees apart around interior pipe 102. A greater or lesser number of sensor housings 122 can be used, and spacing around interior pipe 102 can be even or uneven.

Figure 5:
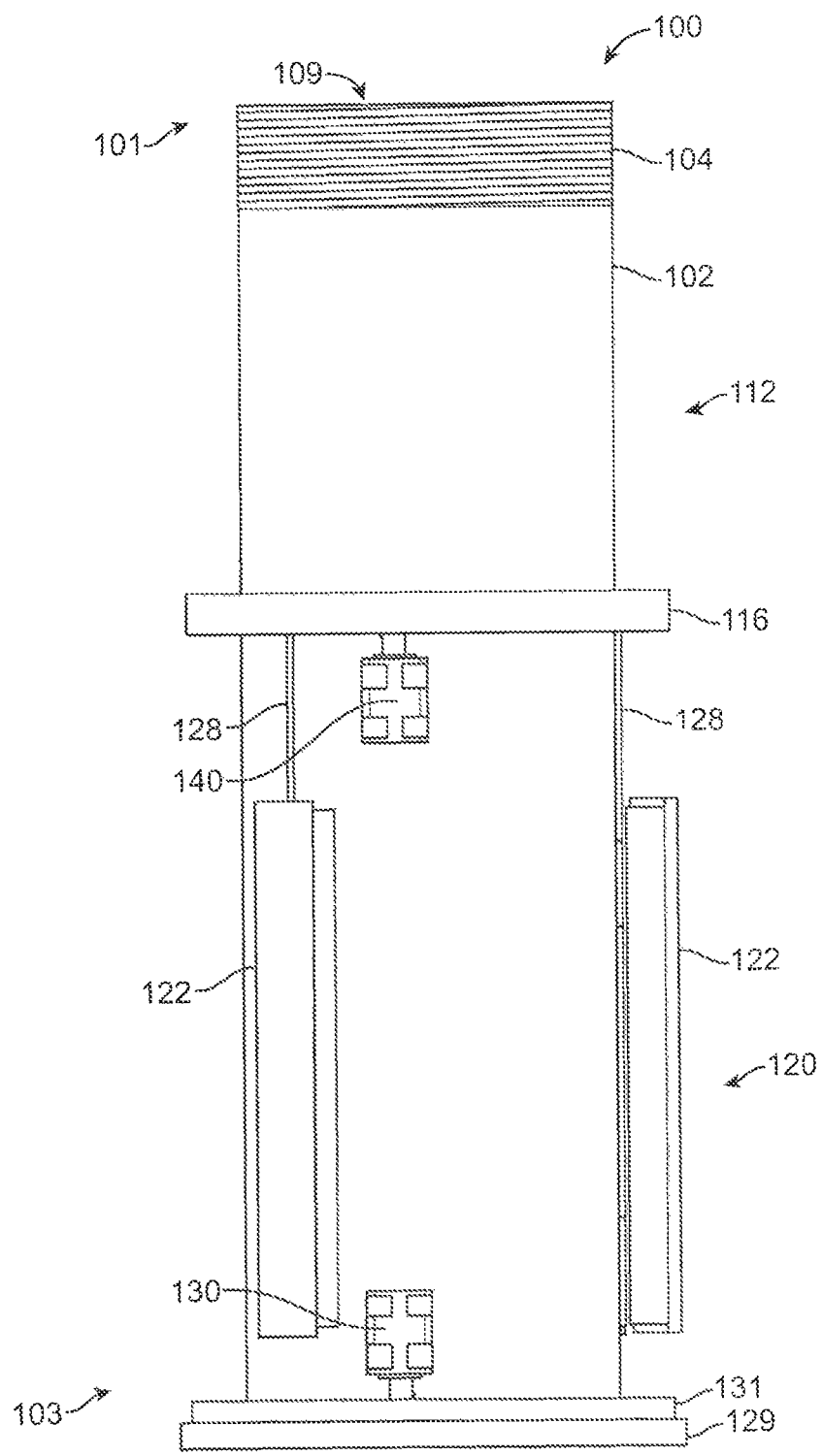
FIG. 5 illustrates an interior view of a sensor pipe, according to an embodiment.

FIG. 5 illustrates a rotated view of sensor pipe 100, according to an embodiment, where protective layer 118 is removed. FIG. 5 illustrates lower motor 130 and upper motor 140. In certain embodiments, lower motor 130 can be connected to seal plate 129. For example, one or more gears can connect lower motor 130 with seal plate 129. In certain embodiments, seal plate 129 can have teeth located along a circumference of seal plate 129. Activating lower motor 130 can cause lower portion 120 to rotate about the longitudinal axis of sensor pipe 100. In certain embodiments, this can rotate ring 116 about the longitudinal axis of sensor pipe 100 as well. Accordingly, sensor housings 122 can be rotated about the longitudinal axis of sensor pipe 100. In certain embodiments, sensor housings 122 can be rotated 360 degrees about the longitudinal axis of sensor pipe 100 in a "carousel" manner. In certain embodiments, ring 131 can be a thrust bearing assembly that provides for pressure relief and rotational travel of lower portion 120.

Similarly, upper motor 140 can be connected to ring 117. For example, one or more gears can connect upper motor 140 with ring 117 (e.g., with teeth located on ring 117). In certain embodiments, activating upper motor 140 can extend cam shafts 128 radially outward from interior pipe 102. This can cause sensor housings 122 attached to cam shafts 128 to extend out of openings 123 in lower casing 121 (as shown in FIG. 2). Cam shafts 128 can be extended such that sensor housings 122 contact shroud 110 and lock sensor housings 122 in place against shroud 110. This can improve seismic data sensing.

Figure 6:
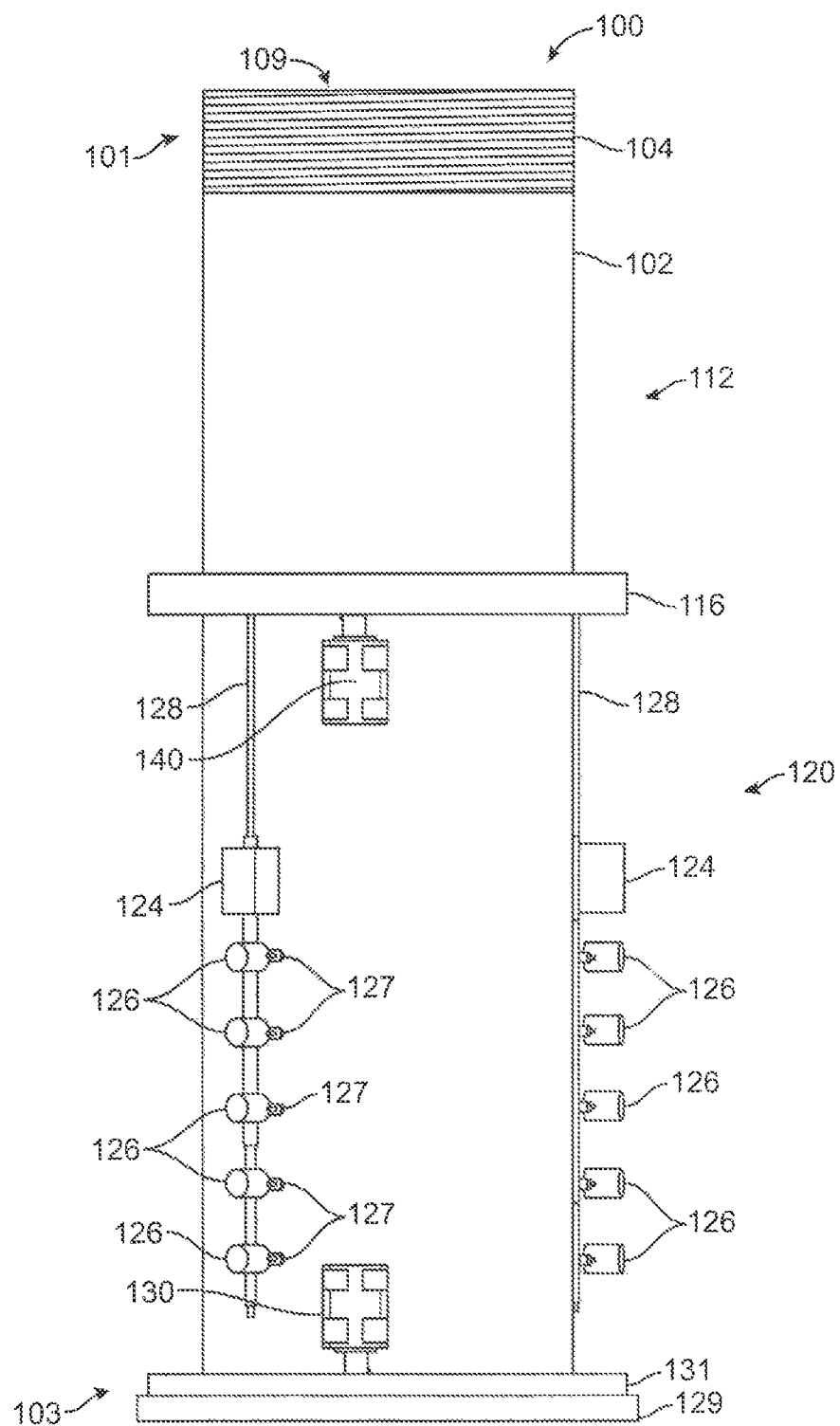
FIG. 6 illustrates an interior view of a sensor pipe, according to an embodiment.

FIG. 6 illustrates sensor pipe 100 where sensor housings 122 are removed, according to an embodiment. One or more sensors 126 can be housed within sensor housing 122. For example, five sensors can be housed within sensor housing 122. In certain embodiments, sensors 126 can be geophones. Sensors 126 can contact cam shaft 128, for example with brackets 127. Brackets 127 can have a seating portion for sensors 126 and can be in contact with cam shaft 128 and/or sensor housing 122. In certain embodiments, sensors 126 can be spaced vertically along cam shaft 12$. Sensors 126 can be spaced evenly or unevenly.

One or more electronics module 124 can be located within sensor housing 122. Electronics module 124 can communicate with control unit 114, for example, by electronic, wireless, or radio frequency communication. Electronics module 124 can provide amplification and receive information from sensors 126. In certain embodiments, electronics module 124 can store this information in a memory.

Figure 7A:
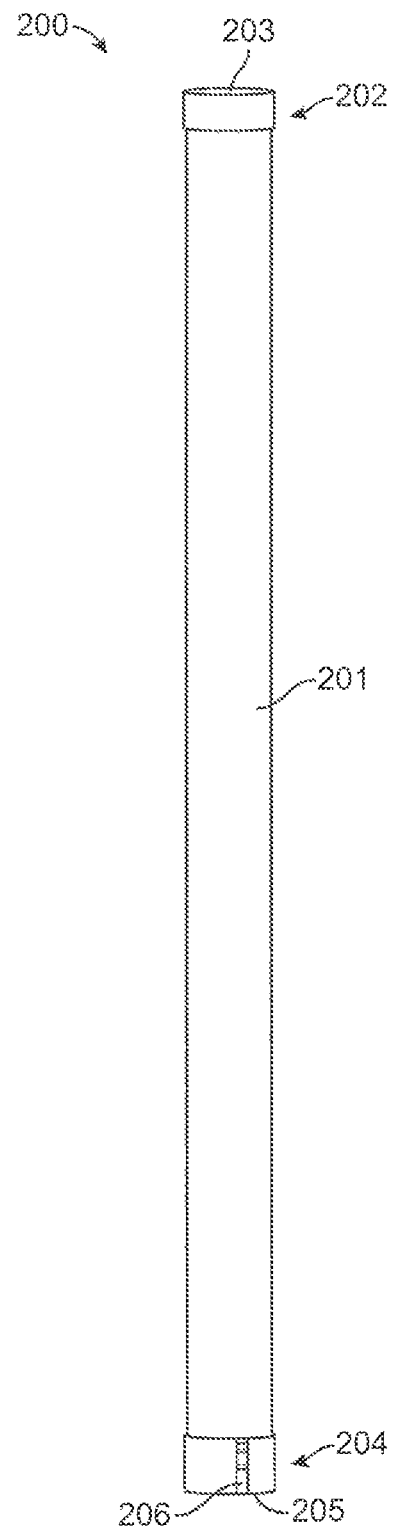
FIG. 7A illustrates an upper pipe, according to an embodiment.

FIG. 7A illustrates upper pipe 200, according to an embodiment. Upper pipe 200 can include outer surface 201, top end 202, and bottom end 204. Upper pipe 200 can also include top opening 203 and bottom opening 205. In certain embodiments, bottom opening 205 has a smaller diameter than top opening 203. A cavity can extend from top opening 203 to bottom opening 205 through the entirety of upper pipe 200. In certain embodiments, bottom end 204 can include channel 206. Channel 206 can allow a cable to run within it so that the cable can be connected to connection port 106 of sensor pipe 100.

Figure 7B:
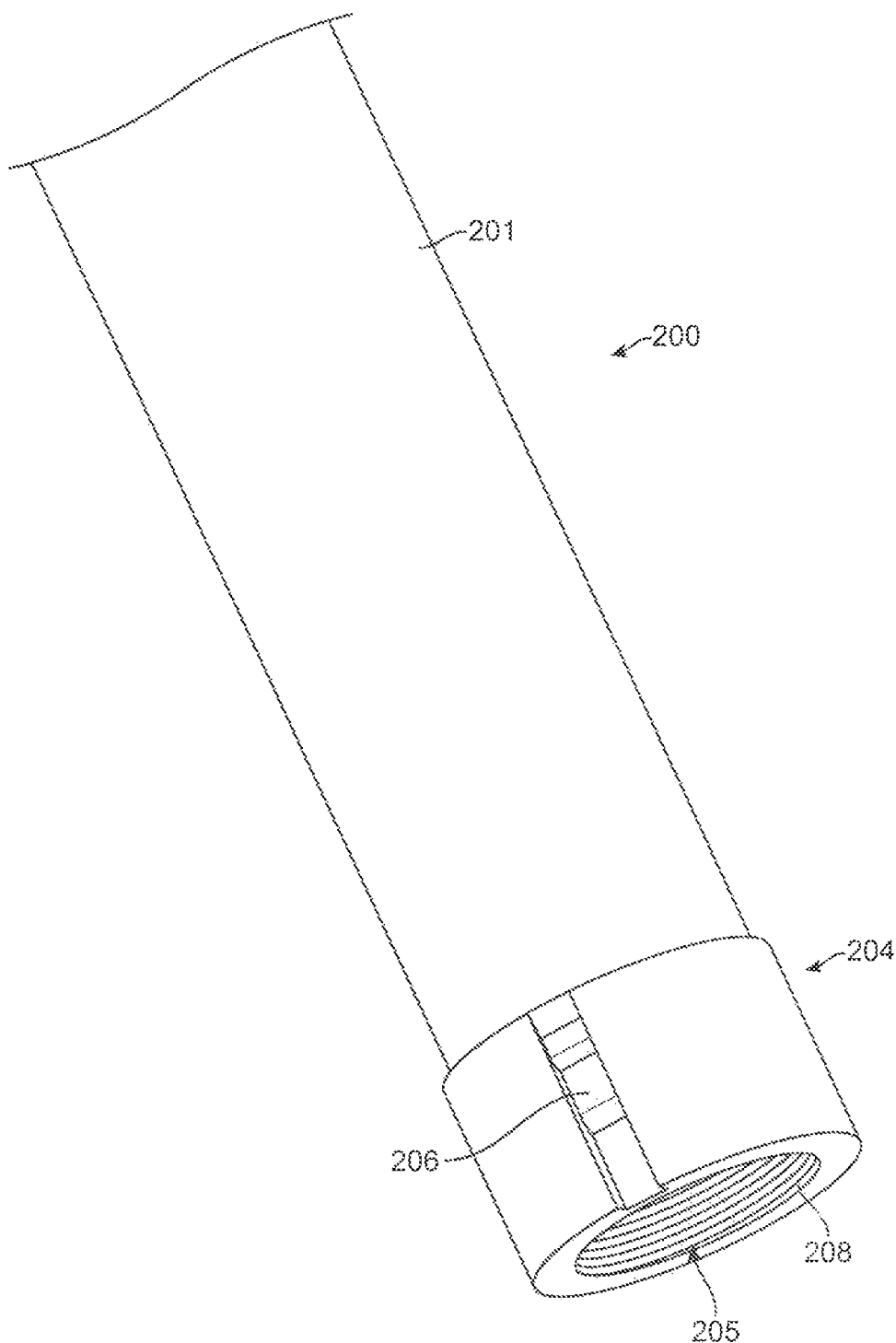
FIG. 7B illustrates a bottom end of an upper pipe, according to an embodiment.

FIG. 7B illustrates a close up view of bottom end 204 of upper pipe 200, according to an embodiment. In certain embodiments, bottom end 204 of upper pipe 200 can connect to top end 101 of sensor pipe 100. In certain embodiments, bottom opening 205 can include interior threading 208. Interior threading 208 can interface with exterior threading 104 of sensor pipe 100 to connect upper pipe 200 with sensor pipe 100.

Figure 8:
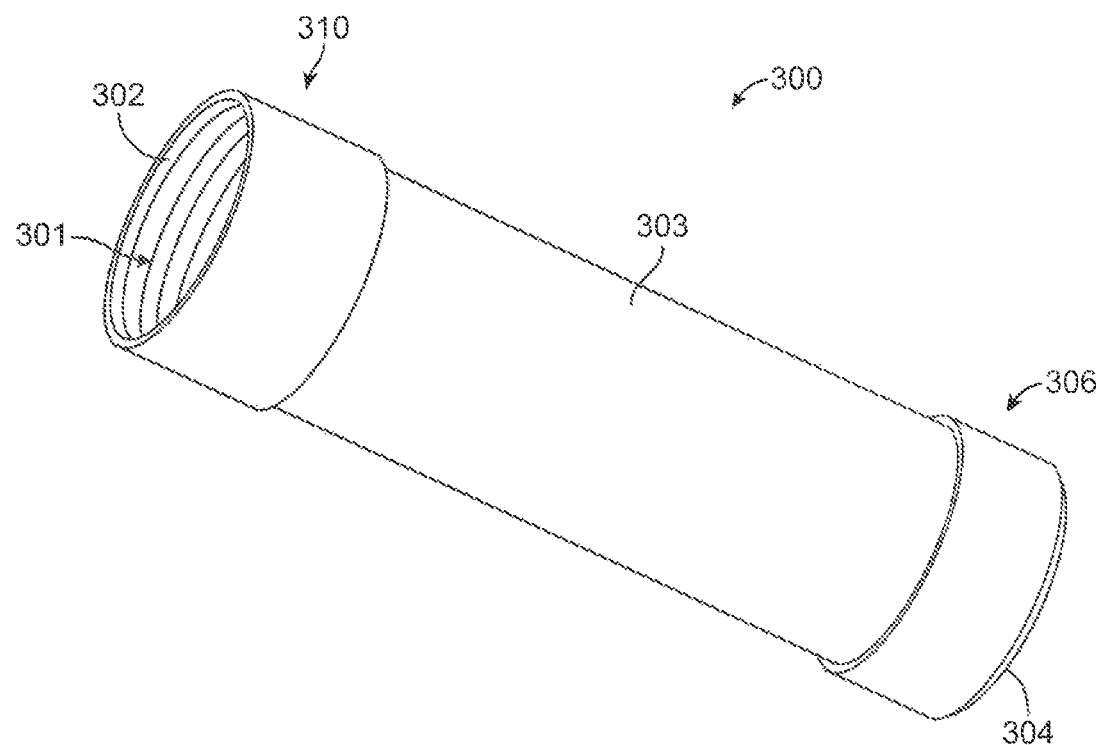
FIG. 8 illustrates a lower pipe, according to an embodiment.

FIG. 8 illustrates lower pipe 300, according to an embodiment. Lower pipe 300 can include top end 310, bottom end 306, and outer surface 303. Top end 310 can have top opening 301. In certain embodiments, top opening 301 can have interior threading 302. Interior threading 302 can facilitate connecting lower pipe 300 to the first section of casing pipe. In certain embodiments, bottom end 306 of lower pipe 300 can include plug 304. Plug 304 can prevent fluid and/or debris from entering lower pipe 30Q until plug 304 is removed or drilled through.

Figure 9:
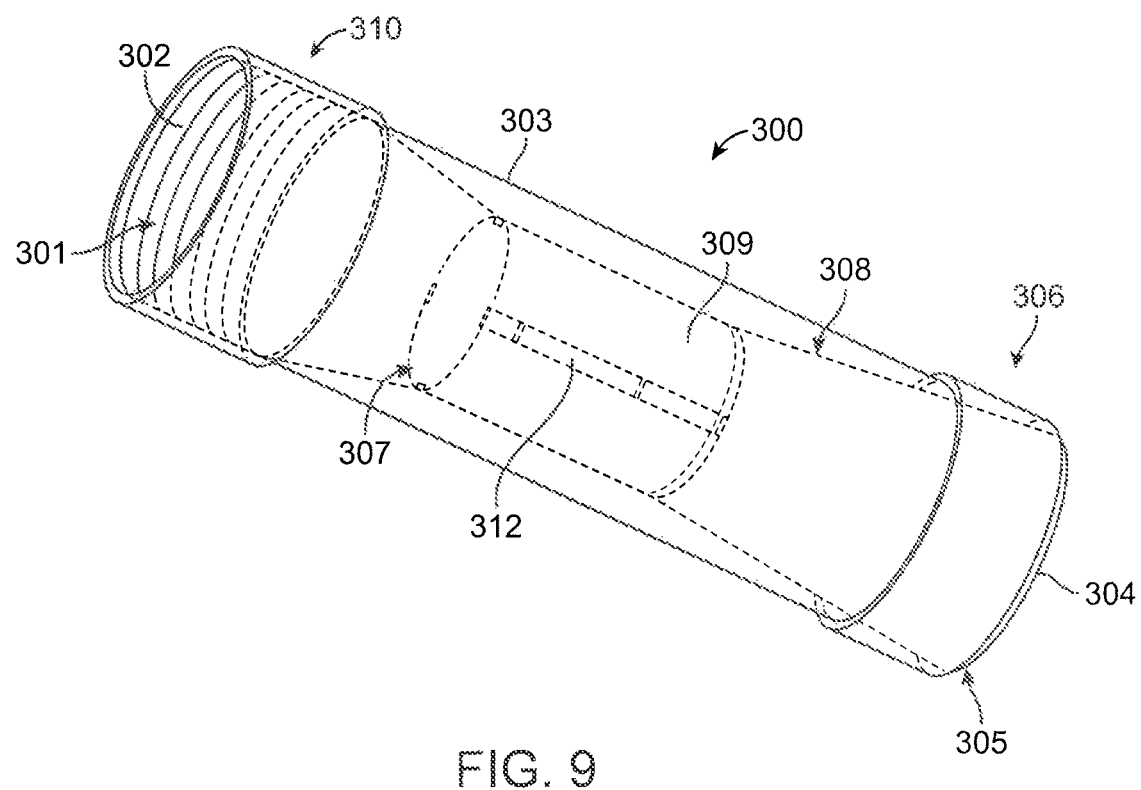
FIG. 9 illustrates a partial interior view of a lower pipe, according to an embodiment.

FIG. 9 illustrates a partial interior view of lower pipe 300 having plug 304, according to an embodiment. Plug 304 can include bottom end 305, top end 307, and tapered region 308. Plug 304 can conform to an interior changing diameter of lower pipe 300. In certain embodiments, plug 304 can have a constant taper between bottom end 305 and top end 307. In certain embodiments, plug 304 can have a different tapering configuration.

Figure 10:
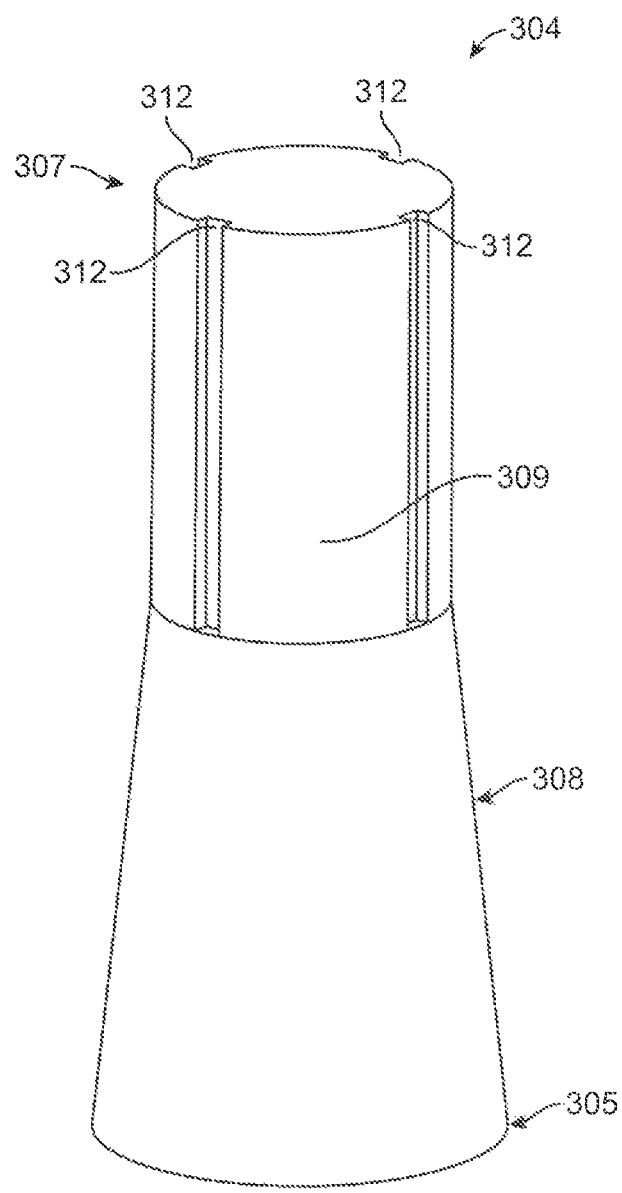
FIG. 10 illustrates a plug for a pipe, according to an embodiment.

FIG. 10 illustrates plug 304, according to an embodiment. Plug 304 can be made from any suitable material, for example, rubber or plastic. Generally, plug 304 should be made from a material that can be drilled through using a standard oil well drill. In certain embodiments, plug 304 can include one or more channels 312. For example, plug 304 can have four channels 312. Channels 312 can be spaced evenly or unevenly. Channels 312 can be located near top end 307 of plug 304 and can facilitate connection of a pipe to plug 304 through top opening 301 of lower pipe 300.

Figure 11:
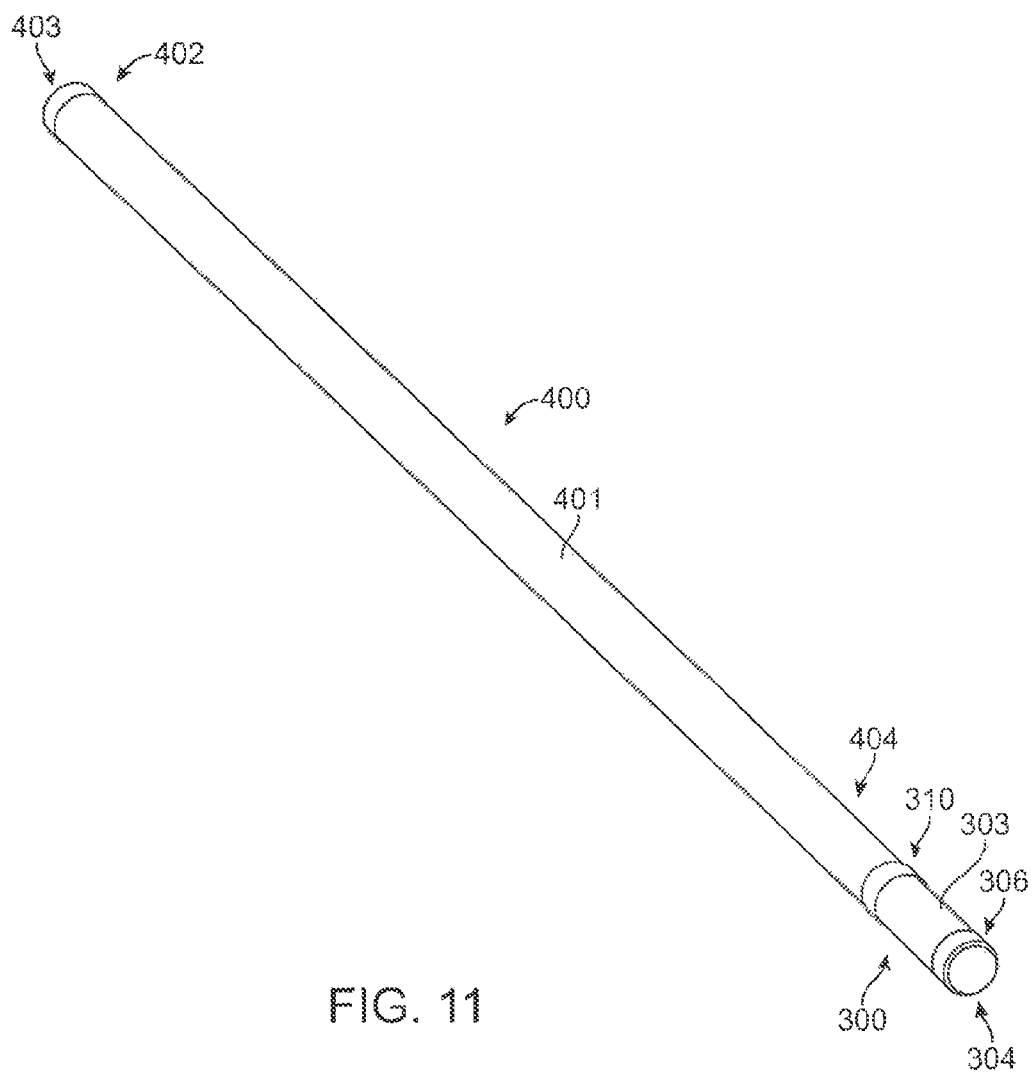
FIG. 11 illustrates a lower pipe connected to a pipe, according to an embodiment.

FIG. 11 illustrates lower pipe 300 connected to pipe 400, according to an embodiment. Pipe 400 can be a standard oil well pipe having top end 402, bottom end 404, outer surface 401, and top opening 403. Bottom end 404 and of pipe 400 can have a bottom opening, which can have exterior threading to interface with interior threading 302 inside top opening 301 of lower pipe 300 in order to connect pipe 400 with lower pipe 300.

Figure 12:
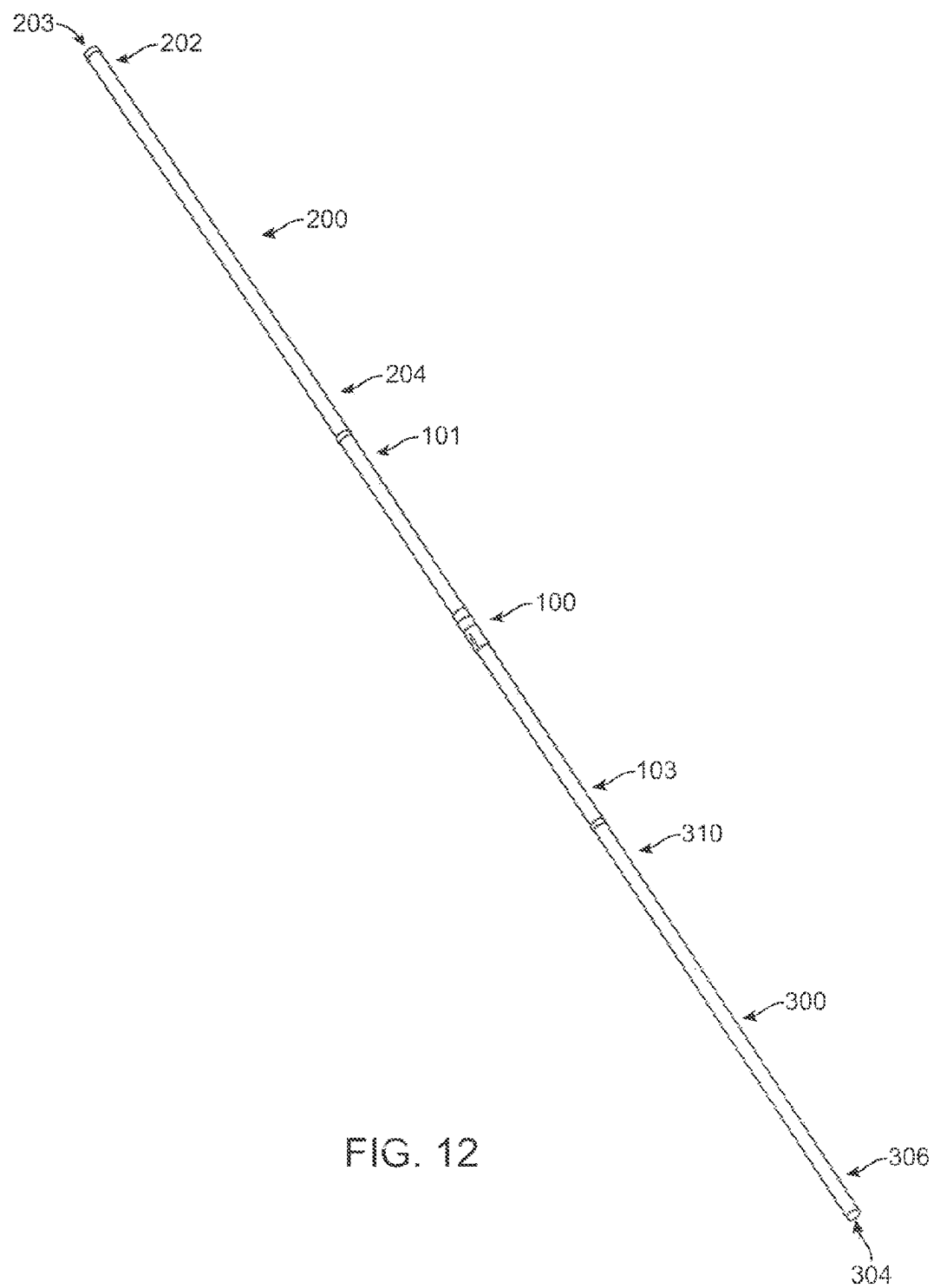
FIG. 12 illustrates a pipe string, according to an embodiment.

FIG. 12 illustrates a portion of a casing string, according to an embodiment. The casing string can include lower pipe 300 haying plug 304. Lower pipe 300 can be connected to sensor pipe 100, which can be connected to upper pipe 200. Other pipes can be included in the casing string and other arrangements of lower pipe 300, sensor pipe 100, and upper pipe 200 are contemplated.

Figure 13A:
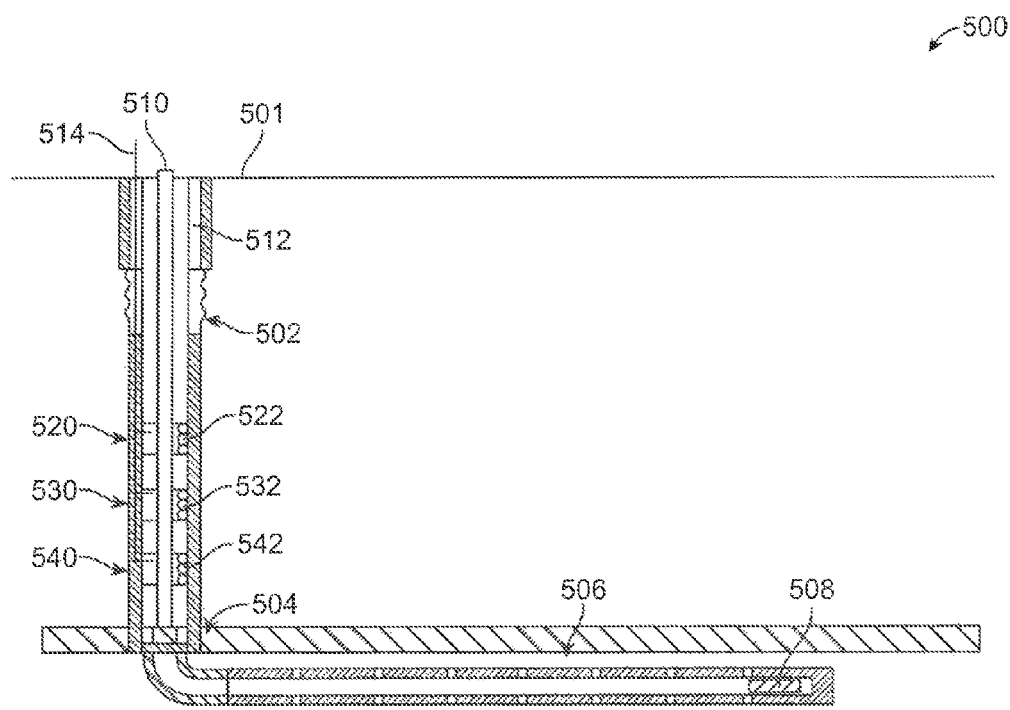
FIG. 13A illustrates a cross-section of a borehole sensing system, according to an embodiment.

FIG. 13A illustrates sensor array system 500, according to an embodiment. In certain embodiments, borehole 502 can be drilled into ground 501. In certain embodiments, pipe 510 surrounded by casing pipe 512 can be located within borehole 502. Pipe 510 can extend within borehole 502 to kickoff point 504.

In certain embodiments, one or more sensor arrays can be located along pipe 510 within borehole 502. For example, three sensor arrays 520, 530, and 540 can be located inside casing pipe 512. In certain embodiments, sensor arrays 520, 530, and 540 can each be located above kickoff point 504. In certain embodiments, one of the sensor arrays can be located at kickoff point 504. In certain embodiments, sensor array 540 can be located approximately 600 feet above kickoff point 540. A greater or lesser number of sensor arrays can be used. The sensor arrays can be evenly or unevenly spaced apart from each other inside casing pipe 512.

One or more groupings of sensors can make up sensor arrays 520, 530, and 540, for example, sensor groupings 522, 532, and 542 shown in FIG. 13A. Sensor groupings can be spaced evenly or unevenly around a longitudinal axis of pipe

510. For example, three groups of sensors can be spaced at 120 degree intervals or four groups of sensors can be spaced at 90 degree intervals. In certain embodiments, one or more cable 514 can run outside and along casing 512 to connect to sensor arrays 520, 530, and 540. Each sensor array can be controlled individually. Thus, by way of example, sensor grouping 522 can be rotated 5 degrees from a known initial position, sensor grouping 532 can be rotated 10 degrees from the known initial position, and sensor grouping 542 can be rotated 15 degrees from the known initial position.

In certain embodiments, horizontal pipe 506 can be located past kickoff point 504. In certain embodiments, horizontal pipe 506 can include a programmable acoustic source 508. Programmable acoustic source 508 can be a downhole tool that performs specific simulated acoustics in the borehole at specific depths, prior to the fracturing process. This can facilitate capturing seismic data through the shale zone along the length of the horizontal borehole to develop a topographical picture of the shale formation surrounding the borehole. The programmable acoustic source 508 can be designed to ping the wall of the well casing in a programmable manner that is repeatable and identifiable at a specific distance within horizontal pipe 506. The programmable acoustic source 508 can work on a sequenced pulse of voltage to a solenoid. The sequence can be determined by software similar to the Morse code pulse, but the frequency of pulse can be selected and variable to allow for signature recognition from sensor arrays 520, 530, and 540. Changing the coded pinging at different depths provides a method to filter extraneous noise through the identification of the coded source, resulting in a precision picture of the targeted area.

Figure 13B:
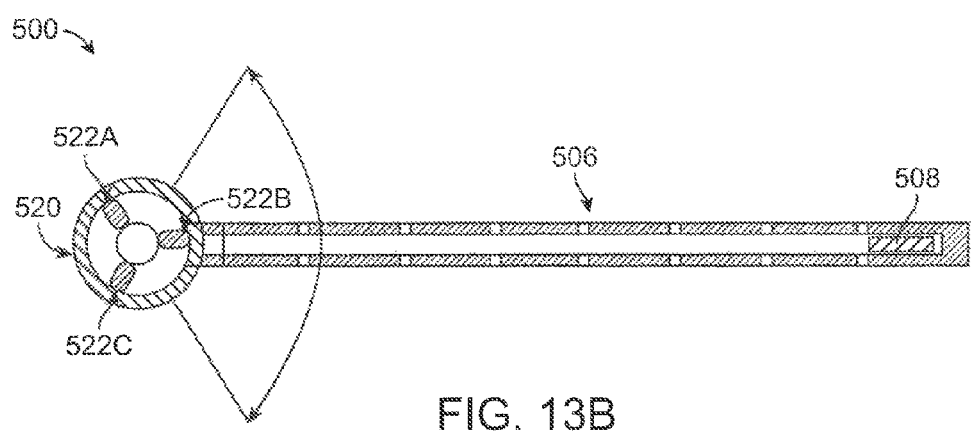
FIG. 13B illustrates a top view of the borehole sensing system shown in FIG. 13A, according to an embodiment.

FIG. 13B illustrates a top view of sensor array system 500, according to an embodiment. This view provides a depiction down borehole 502. As shown in FIG. 13B, each sensor array, for example, sensor array 520 can have one or more sensor bank, illustrated as 522A, 522B, and 522C. More or less than three sensor banks can be used. In certain embodiments where three sensor banks are used, the sensor banks can be located 120 degrees from each other. The sensor banks can be rotated 360 degrees about pipe 510. As shown by the arrow in FIG. 13B, generally each sensor bank only needs to rotate 60 degrees clockwise and 60 degrees counter-clockwise to cover the entire 360 degree area surrounding pipe 510.

Figure 14:
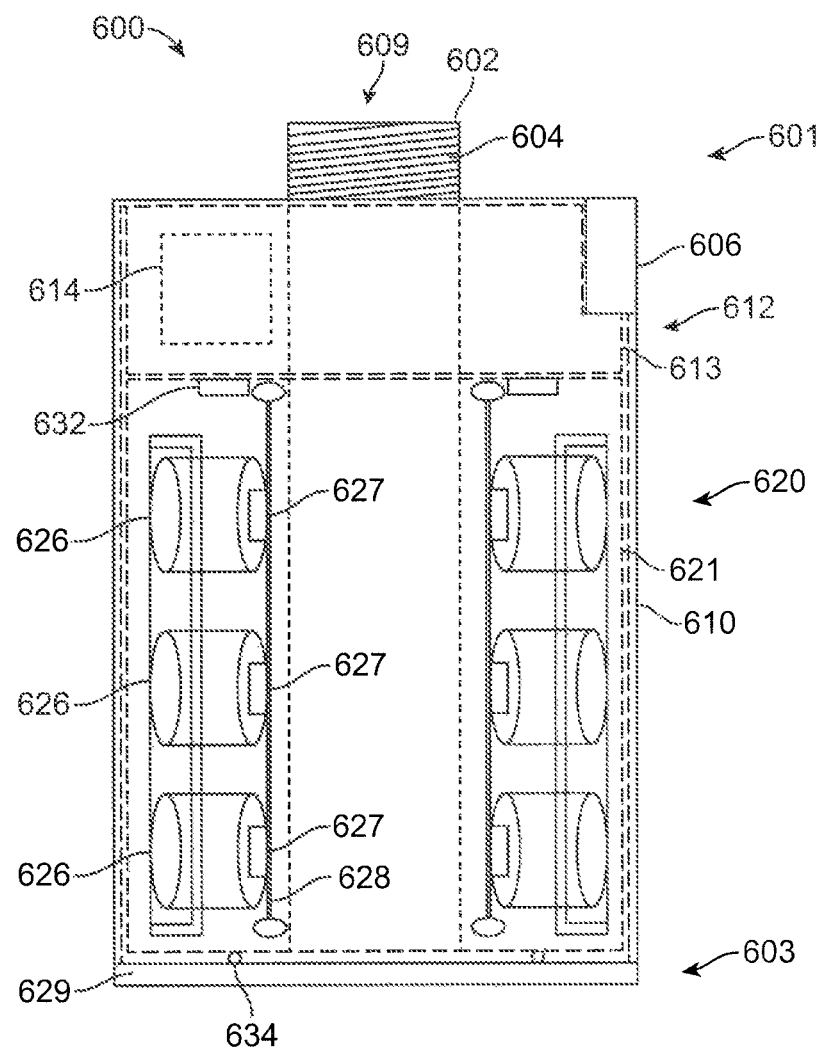
FIG. 14 illustrates a sensor pipe, according to an embodiment.

FIG. 14 illustrates sensor pipe 600, according to an embodiment. Sensor pipe 600 can include top end 601 and bottom end 603. Sensor pipe 600 can also include interior pipe 602 having interior passage 609. In certain embodiments, a portion of interior pipe 602 can have exterior threading 604.

Sensor pipe 600 can include shroud 610, which can surround upper casing 613 and lower casing 621. Sensor pipe 600 can include upper portion 612 and lower portion 620. Sensor pipe 600 can include control unit 614. In certain embodiments, control unit 614 can be included within upper casing 613. In certain embodiments, upper portion 612 of sensor pipe 600 can include connection port 606.

In certain embodiments, sensors 626 can be located within lower casing 621. In certain embodiments, sensors 626 can contact cam shaft 628, for example, with brackets 627. In certain embodiments, seal plate 629 can be located near the bottom of lower portion 620. In certain embodiments, gear 632 can connect to cam shaft 628. By driving a motor (not shown) to rotate gear 632, cam shaft 628 can be moved radially outward away from interior pipe 602 in order to press a sensor array housing and/or sensors 626 against shroud 610 and upper casing 613.

In certain embodiments, sensor pipe 600 can include one or more bearing 634 along seal plate 629. Bearing 634 can facilitate rotation of lower portion 620 about interior pipe 602 when driven by a motor (not shown). This causes sensors 626 to rotate about interior pipe 602 as well.

METHODS AND EXAMPLES

Before permanently installing geophones into a pipe casing, it is preferable that a subsurface plan is developed after reviewing core samples to determine locations where the geophones will be installed in the casing string. The subsurface plan can focus on positioning the geophones in the hardest rock formation downhole above the kickoff point. From this plan, the length of signal cable required to send downhole to each sensor array can be determined.

Once the plan is set, a lower pipe having a plug can be attached to a first section of pipe, for example a 13⅜" pipe, as part of a pipe string. A sensor pipe can be attached along the pipe string based on the subsurface plan so that the sensor arrays are located at the predetermined depths along the pipe string.

One or more cables running along the pipe string can supply electrical and communication links to each sensor array. A computer can interface with each cable to perform initial tests and verification of the system before insertion into the wellbore and monitor the system's integrity as it travels downhole. Before submerging the sensor pipe into the wellbore, a system check can be performed. This can include checking the connection of the signal cable to the array and performing an electrical test of the sensors for system calibration, communication, and alignment.

In certain embodiments, three separate sensor arrays can be installed at depth intervals determined in the subsurface plan. In certain embodiments, each sensor array can have three banks of five geophones. The geophones can be stacked vertically and the banks can be spaced 120 degrees apart from each other. The electronics, mechanical systems, and geophones can be hermetically sealed inside each array.

Each bank of geophones can have a mechanical method for moving the banks outward, pressing the geophones against the pipe shroud. This can provide surface contact and lock the array in place. The positioning of each bank can also have a rotational travel range of ±360 degrees from zero (0). This provides for triple system redundancy within each array. In the event of failure of the primary bank, the array can be repositioned to utilize the second or third bank of geophones as the primary replacement.

In certain embodiments, once the 13⅜" pipe has reached its drilled depth, one or more internal pipes having a smaller diameter, for example 9⅝", can be inserted within the 13⅜" pipe. The internal pipes can travel through each sensor array, and lock into a bottom pipe having a plug. The plug can be forced out the bottom or drilled through. Cementing of the 13⅜" casing can then proceed through the 9⅝" pipe.

In certain embodiments, the sensor arrays can be connected to a Data Support Kit (DSK) via the cables. The DSK is a portable ruggedized container for oil field applications designed to protect and house electronic hardware supporting the BSS. The DSK can collect, store, and process data from each sensor array. For example, the DSK can include a terminal area, data storage device, processing equipment, communication instrumentation, battery banks, air conditioning system, a filtration system, and a power distribution system that provides constant electrical power. A secondary function of the DSK is to provide preprocessing capability for on-site engineering analysis. It can also provide multiple means of transferring data from the field to other locations quickly and efficiently, for example, via a WiFi or RF transmitter/receiver.

The foregoing description has been presented for purposes of illustration and description. It is not intended to be exhaustive or to limit the precise embodiments disclosed. Other modifications and variations may be possible in light of the above teachings.

The embodiments and examples were chosen and described in order to best explain the principles of the embodiments and their practical application, and to thereby enable others skilled in the art to best utilize the various embodiments with modifications as are suited to the particular use contemplated. By applying knowledge within the skill of the art, others can readily modify and/or adapt for various applications such specific embodiments, without undue experimentation, without departing from the general concept. Therefore, such adaptations and modifications are intended to be within the meaning and range of equivalents of the disclosed embodiments, based on the teaching and guidance presented herein.

What is clamed is:

1. A sensing system for a well borehole comprising:
   a pipe;
   a cam shaft disposed along a portion of the pipe;
   a plurality of sensors disposed on the cam shaft; and
   a control mechanism for rotating the sensors around a longitudinal axis of the pipe, wherein the control mechanism is configured to rotate the sensors after the sensing system is downhole in the well borehole.

2. The sensing system of claim 1, wherein the pipe comprises:
   an upper portion comprising an upper housing; and
   a lower portion comprising a lower housing.

3. The sensing system of claim 2, further comprising a shroud surrounding the upper portion and the lower portion of the pipe.

4. The sensing system of claim 1, wherein the control mechanism comprises a motor.

5. The sensing system of claim 1, wherein the plurality of sensors are located within a sensor housing contacting the cam shaft.

6. The sensing system of claim 1, wherein the sensors rotate 360 degrees around the longitudinal axis of the first pipe.

7. The sensing system of claim 1, further comprising a control unit for communicating with the sensors.

8. The sensing system of claim 1, wherein the sensors are geophones.

9. The sensing system of claim 8, wherein the geophones are arranged in three groups spaced evenly around the longitudinal axis of the pipe.

10. The sensing system of claim 9, wherein each group of geophones comprises five geophones.

11. The sensing system of claim 9, wherein each group of geophones is located inside a housing, and wherein an electronics module is located inside the housing.

12. The sensing system of claim 9, wherein the geophones in each group of geophones are spaced vertically in relation to each other.

13. The sensing system of claim 1, further comprising a second pipe, the second pipe comprising:
    a bottom end;
    a top end; and
    a plug,
    wherein the top end of the second pipe is connected to a bottom end of the pipe.

14. The sensing system of claim 13, wherein the plug is tapered such the a first end of the plug located at the bottom end of the second pipe has a diameter that is greater than a second end of the plug located closer to the top end of the second pipe.

15. A sensor system for a well pipe comprising:
    a plurality of sensor arrays located along the well pipe, each sensor array comprising:
    a plurality of sensor groups comprising one or more sensors; and
    a means for rotating the sensor groups around a longitudinal axis of the well pipe, wherein the means for rotating the sensor groups is configured to rotate the sensor groups after the sensor system is downhole in the well pipe.

16. The sensor system of claim 15, wherein each sensor array comprises three sensor groups spaced at 120 degree intervals around the longitudinal axis of the well pipe.

17. The sensor system of claim 15, wherein each sensor array is located within an interior of an outer casing mounted about the well pipe.

18. The sensor system of claim 17, wherein each sensor group is contained within a sensor housing contacting a cam shaft.

19. The sensor system of claim 15, wherein the sensors are geophones.

20. A method of measuring seismic activity within a well borehole, comprising, in order:
    arranging one or more sensor arrays downhole in a well pipe, each sensor array comprising:
    a plurality of sensor groups comprising one or more sensors; and
    a motor for rotating the sensor groups around a longitudinal axis of the well pipe;
    rotating the sensor groups of at least one sensor array around the longitudinal axis of the well pipe; and
    measuring seismic data using the sensors.

21. The method of claim 20, wherein rotating the sensor groups comprises actuating the motor.

22. The method of claim 20, wherein the sensors of each sensor group are secured to a cam shaft, and wherein the method further comprising moving the cam shafts radially outward relative to the longitudinal axis of the well pipe such that the sensors contact an outer casing surrounding each sensor array.

23. The method of claim 20, further comprising calibrating the sensor arrays using signals from a remote programmable acoustical source.

* * * * *